(12) United States Patent
Murase et al.

(10) Patent No.: US 7,753,026 B2
(45) Date of Patent: Jul. 13, 2010

(54) IGNITION CONTROL SYSTEM FOR INTERNAL COMBUSTION ENGINE

(75) Inventors: Nao Murase, Susono (JP); Nobuhiko Koga, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/310,563

(22) PCT Filed: Apr. 4, 2008

(86) PCT No.: PCT/JP2008/057128
§ 371 (c)(1),
(2), (4) Date: Feb. 27, 2009

(87) PCT Pub. No.: WO2008/123633
PCT Pub. Date: Oct. 16, 2008

(65) Prior Publication Data
US 2010/0031922 A1 Feb. 11, 2010

(51) Int. Cl.
*F02P 5/15* (2006.01)
(52) U.S. Cl. .................. 123/339.11; 123/339.22; 123/339.24; 123/406.49; 123/406.53; 123/406.55
(58) Field of Classification Search ........... 123/339.11, 123/339.22, 339.24, 406.19, 406.49, 406.53, 123/406.54, 406.55
See application file for complete search history.

(56) References Cited

U.S. PATENT DOCUMENTS

| 4,307,691 | A | * | 12/1981 | Nagae et al. | 123/406.49 |
| 4,378,770 | A | * | 4/1983 | Ikeura | 123/406.53 |
| 4,399,789 | A | * | 8/1983 | Yano | 123/339.11 |
| 4,558,674 | A | * | 12/1985 | Okado et al. | 123/406.37 |
| 4,570,596 | A | * | 2/1986 | Sato | 123/406.55 |
| 4,590,563 | A | * | 5/1986 | Matsumura et al. | 701/105 |
| 5,016,590 | A | * | 5/1991 | Ohkumo | 123/406.49 |
| 5,199,400 | A | * | 4/1993 | Sprenger et al. | 123/339.24 |
| 5,280,772 | A | * | 1/1994 | Weber et al. | 123/339.11 |
| 5,957,110 | A | * | 9/1999 | Yoshioka | 123/406.49 |
| 6,109,235 | A | * | 8/2000 | Hoshiba et al. | 123/339.11 |
| 7,017,548 | B2 | * | 3/2006 | Sawada et al. | 123/339.11 |

(Continued)

FOREIGN PATENT DOCUMENTS

JP    A-03-057879    3/1991

(Continued)

*Primary Examiner*—Erick Solis
(74) *Attorney, Agent, or Firm*—Oliff & Berridge, PLC

(57) ABSTRACT

An object to be achieved by the present invention is to achieve ignition timing that is suitable for an environment in which a spark ignition internal combustion engine is used during the period of starting of the internal combustion engine and warm-up thereof just after starting. To achieve this object, according to the present invention, in an ignition control system for an internal combustion engine in which, ignition timing is controlled by feedback in such a way that the engine rotation speed becomes equal to a target rotation speed when the temperature of the internal combustion engine is lower than a prescribed temperature, and retard control for retarding the ignition timing by a predetermined amount from target ignition timing is performed when the temperature of the internal combustion engine is equal to or higher than the prescribed temperature, the aforementioned prescribed temperature is changed according to the altitude of the place where the internal combustion engine is used.

3 Claims, 4 Drawing Sheets

U.S. PATENT DOCUMENTS

| | | | | |
|---|---|---|---|---|
| 7,273,033 B2 * | 9/2007 | Kinoshita | ............. | 123/339.11 |
| 2003/0168041 A1 * | 9/2003 | Kubo | ................... | 123/339.11 |
| 2005/0188953 A1 * | 9/2005 | Ishikawa et al. | ....... | 123/339.11 |

FOREIGN PATENT DOCUMENTS

| | | |
|---|---|---|
| JP | A-2001-082226 | 3/2001 |
| JP | A-2002-097983 | 4/2002 |
| JP | A-2002-235645 | 8/2002 |
| JP | B2-2-3779075 | 3/2006 |

\* cited by examiner

IGNITION CONTROL SYSTEM FOR INTERNAL COMBUSTION ENGINE

This application is the national phase application under 35 U.S.C. §371 of PCT international application No. PCT/JP2008/057128 filed on 4 Apr. 2008, which claims priority to Japanese patent application No. 2007-098433 filed on 4 Apr. 2007, the contents of which are incorporated herein by reference.

TECHNICAL FIELD

The present invention relates to a technology of controlling ignition in a spark ignition internal combustion engine.

BACKGROUND ART

Japanese Patent Application Laid-Open No. 2001-82226 discloses a technology of controlling ignition timing by feedback so that the engine rotation speed becomes equal to a target speed, during the period of starting of a spark ignition internal combustion engine and warm-up thereof just after starting etc.

Japanese Patent Application Laid-Open No. 2002-97983 discloses a technology in which when the difference between a target engine rotation speed and the actual engine rotation speed is large and a feedback amount of ignition timing is large in a predetermined time period after the starting of a spark ignition internal combustion engine, a correction for increasing the fuel injection quantity is performed.

Japanese Patent Application Laid-Open No. 3-57879 discloses a technology in which in a spark ignition internal combustion engine in which the ignition timing is advanced in high altitude places, an advance amount of ignition timing is decreased according to a decrease in the atmospheric pressure.

DISCLOSURE OF THE INVENTION

An object of the present invention is to provide an ignition control system for a spark ignition internal combustion engine to achieve ignition timing that is more suitable for the environment in which the internal combustion engine is used, during the period of starting of the internal combustion engine and warm-up thereof just after starting etc.

To achieve this object, according to the present invention, in an ignition control system that controls ignition timing by feedback so that a value correlating with the engine rotation speed of an spark ignition internal combustion engine converges to a target value, a condition for executing the aforementioned feedback control is changed according to the environment in which the internal combustion engine is used.

The value correlating with the engine rotation speed may be, for example, an increase in the engine rotation speed during rotation of the engine output shaft (or crankshaft) from a reference crank angle to a predetermined crank angle, a time required for the engine output shaft to rotate from the reference crank angle to the predetermined crank angle, or integration of the angular speed of rotation of the engine output shaft from the reference angle to the predetermined crank angle.

During the period of starting of an internal combustion engine and warm-up thereof just after starting and on other occasions (e.g. during fast idle), it is necessary to activate catalyst provided in an exhaust system of the internal combustion engine at early time.

One conceivable method for this is to increase the temperature of the exhaust gas during the period of warm-up of the internal combustion engine by retarding ignition timing from a specified ignition timing (which method will be hereinafter referred to as "warm-up retard control").

However, during the period of starting and warm-up of the internal combustion engine, the temperature of the internal combustion engine is low, and therefore an extension of the starting period and a change in the engine rotation speed etc. are likely to occur due to influences of the condition of fuel and friction etc. Therefore, if the above described warm-up retard control is performed at a time when the temperature of the internal combustion engine is low, there is a possibility that an extension of the starting period and a change in the idle rotation speed etc. are caused.

One conceivable solution to this is to control ignition timing by feedback so that a value correlating with the engine rotation speed converges to a target value (which method will be hereinafter referred to as "rotation speed feedback control"), when the temperature of the internal combustion engine is lower than a prescribed temperature.

By the way, in cases where an internal combustion engines are used in high altitude places, fuel tends to be vaporized and/or atomized more easily than in cases where the internal combustion engine is used in low altitude places. Therefore, in the case in which the internal combustion engine is used in high altitude places, if the rotation speed feedback control is executed according an execution condition same as the condition in the case in which the internal combustion engine is used in low altitude places, disadvantages such as unwanted delay in the activation timing of catalyst will result.

In view of the above, according to the present invention, in an ignition control system for an internal combustion engine that performs the rotation speed feedback control of ignition timing when the temperature of the internal combustion engine is lower than a prescribed temperature, the aforementioned prescribed temperature is changed according to the altitude of the environment in which the internal combustion engine is used.

Specifically, the ignition control system for an internal combustion engine according to the present invention comprises a feedback unit for controlling ignition timing by feedback in such a way that a value correlating with the engine rotation speed converges to a target value, when the temperature of the internal combustion engine is lower than a prescribed temperature, an obtaining unit for obtaining an atmospheric pressure, and a changing unit for changing said prescribed temperature according to the atmospheric pressure obtained by said obtaining unit.

By this configuration, when the altitude of the place in which the internal combustion engine changes, a situation in which the rotation speed feedback control of ignition timing is performed unwantedly and a situation in which the rotation speed feedback control of ignition timing is not performed though necessary are prevented from occurring.

Therefore, according to the present invention, in an ignition control system for a spark ignition internal combustion engine, ignition timing that is more suitable for the environment in which the internal combustion engine is used is achieved.

The changing unit according to the present invention may make the prescribed temperature lower, as the atmospheric pressure obtained by the obtaining unit becomes lower, and the changing unit may make the prescribed temperature higher, as the atmospheric pressure obtained by the obtaining unit becomes higher.

As the atmospheric pressure decreases (namely as the altitude increases), fuel tends to be vaporized and/or atomized more easily. For this reason, even if the prescribed temperature is made lower, an extension of the starting period and a decrease in the idle rotation speed can be prevented from occurring.

Thus, when the altitude of the place where the internal combustion engine is used becomes high, switching from the rotation speed feedback control to the warm-up retard control can be effected at early time. As a result, advantageous effects such as early activation of catalyst can be achieved.

BEST MODE FOR CARRYING OUT THE INVENTION

In the following, a specific embodiment of the present invention will be described with reference to the drawings. Dimensions, materials, shapes and relative arrangements etc. of the components that will be described in connection with the embodiment are not intended to limit the technical scope of the present invention only to them, unless otherwise stated.

Figure 1:
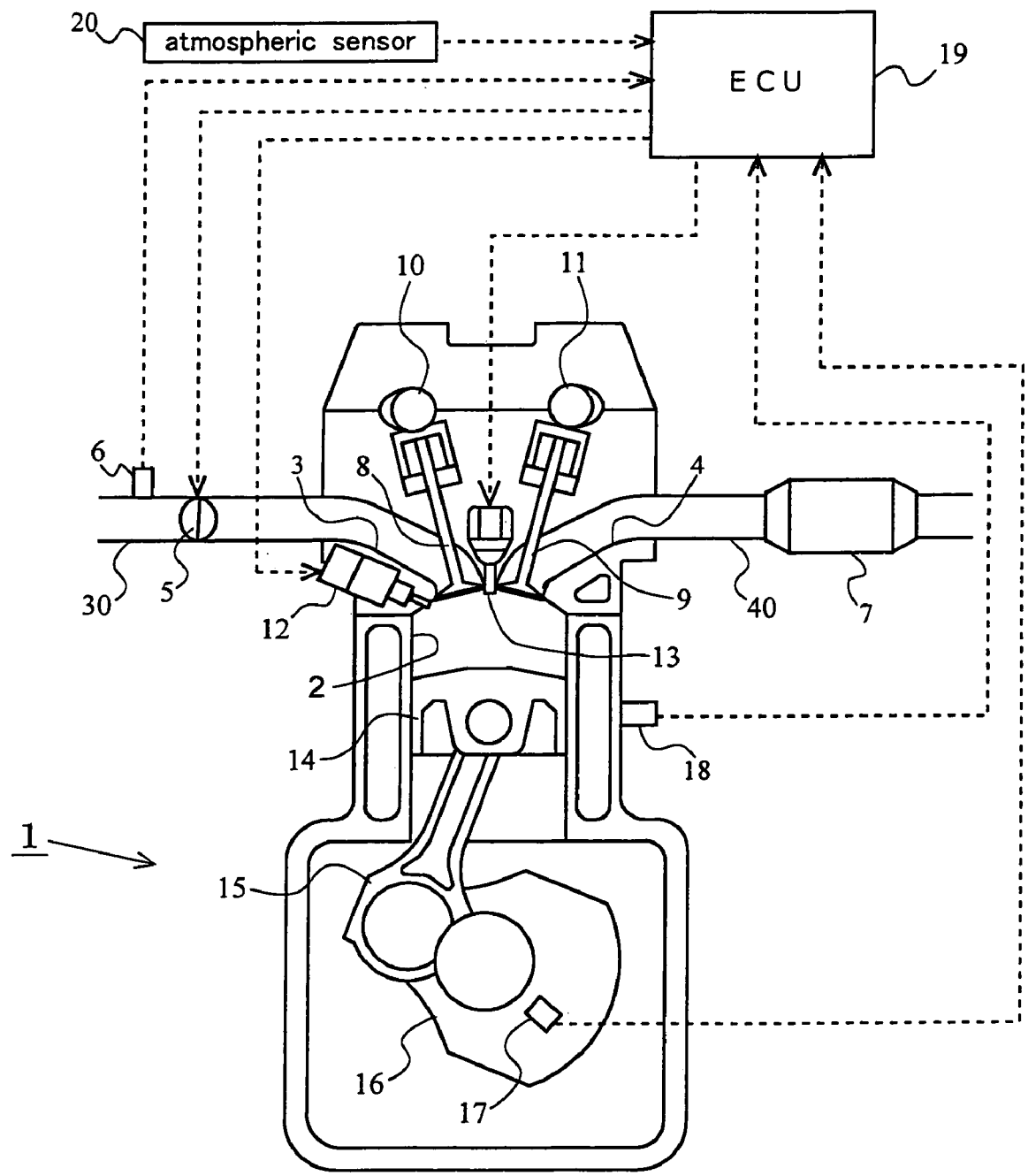
FIG. 1 is a diagram showing the general configuration of an ignition control system for an internal combustion engine.

FIG. 1 is a diagram showing the general configuration of an ignition control system for an internal combustion engine according to the present invention. The internal combustion engine 1 shown in FIG. 1 is a four-stroke-cycle, spark-ignition engine (gasoline engine) having a plurality of cylinders 2.

The cylinder 2 of the internal combustion engine 1 is connected with an intake passage 30 via an intake port 3 and with an exhaust passage 40 via an exhaust port 4.

A throttle valve 5 that regulates the quantity of air flowing in the intake passage 30 is provided in the intake passage 30. An airflow meter 6 that measures the quantity of air flowing in the intake passage 30 is provided in the intake passage 30 upstream of the throttle valve 5.

An exhaust gas purification apparatus 7 is provided in the exhaust passage 40. The exhaust gas purification apparatus 7 is equipped with a three-way catalyst or an NOx storage reduction catalyst or the like to purify the exhaust gas at a time when its temperature is within a specific active temperature range.

The internal combustion engine 1 is equipped with an intake valve 8 that opens and closes the open end of the intake port 3 facing the interior of the cylinder 2 and an exhaust valve 9 that opens and closes the open end of the exhaust port 4 facing the interior of the cylinder 2. The intake valve 8 and the exhaust valve 9 are driven respectively by an intake side cam shaft 10 and an exhaust side cam shaft 11 so as to be opened and closed.

Above the cylinder 2 are provided a fuel injection valve 12 that injects fuel directly into the cylinder 2 and an ignition plug 13 that ignites the air-fuel mixture in the cylinder 2. A piston 14 is inserted in each cylinder 2 in a slidable manner. The piston 14 is connected with a crankshaft 16 via a connecting rod 15.

The fuel injection valve 12 may be disposed at a position at which it can inject fuel into the intake port 3.

A crank position sensor 17 that measures the rotation angle of the crankshaft 16 is provided at a position near the crankshaft 16 in the internal combustion engine 1. Furthermore, a water temperature sensor 18 that measures the temperature of cooling water circulating in the internal combustion engine 1 is attached to the internal combustion engine 1.

To the internal combustion engine 1 configured as above is annexed an ECU 19. The ECU 19 is an electronic control unit having a CPU, ROM and RAM, etc. The ECU 19 is electrically connected with various sensors such as the air flow meter 6, the crank position sensor 17, the water temperature sensor 18 and an atmospheric pressure sensor 20, and measurement values of these sensors can be input to the ECU 19.

The ECU 19 electrically controls the throttle valve 5, the fuel injection valve 12 and the ignition plug 13 based on measurement values of the above-mentioned various sensors. For example, the ECU 19 performs ignition timing control during the period of starting and warm-up of the internal combustion engine 1.

In the following, the ignition timing control during the period of starting and warm-up of the internal combustion engine 1 will be described.

When the temperature of the internal combustion engine 1 is low as is the case during the period of starting and warm-up of the internal combustion engine 1, it tends to be difficult to vaporize or atomize fuel injected by the fuel injection valve 12, and in addition the quantity of vaporized or atomized fuel is difficult to be made stable. For this reason, variations in the starting period and variations in the idle rotation speed are likely to occur.

In view of this, during the period of starting of the internal combustion engine 1 and warm-up just after starting, it is preferred that a feed back control (which will be referred to as rotation speed feedback control) of ignition timing be performed so that the engine rotation speed (that is, specifically, the angular velocity of rotation of the crankshaft) becomes equal to a desired target rotation speed (i.e. a target angular velocity of rotation).

On the other hand, since during the period of starting and warm-up of the internal combustion engine 1 the temperature of the exhaust gas purification apparatus 7 is lower than its active temperature range, the exhaust gas from the internal combustion engine 1 is emitted to the atmosphere without being purified. If such a state continues over a long period, a significant increase in harmful exhaust emission will result.

In view of this, it is desired to raise the temperature of the exhaust gas during the period of starting and warm-up of the internal combustion engine 1 by retarding ignition timing by a prescribed amount from the specified ignition timing (which control will be referred to as warm-up retard control).

Figure 2:
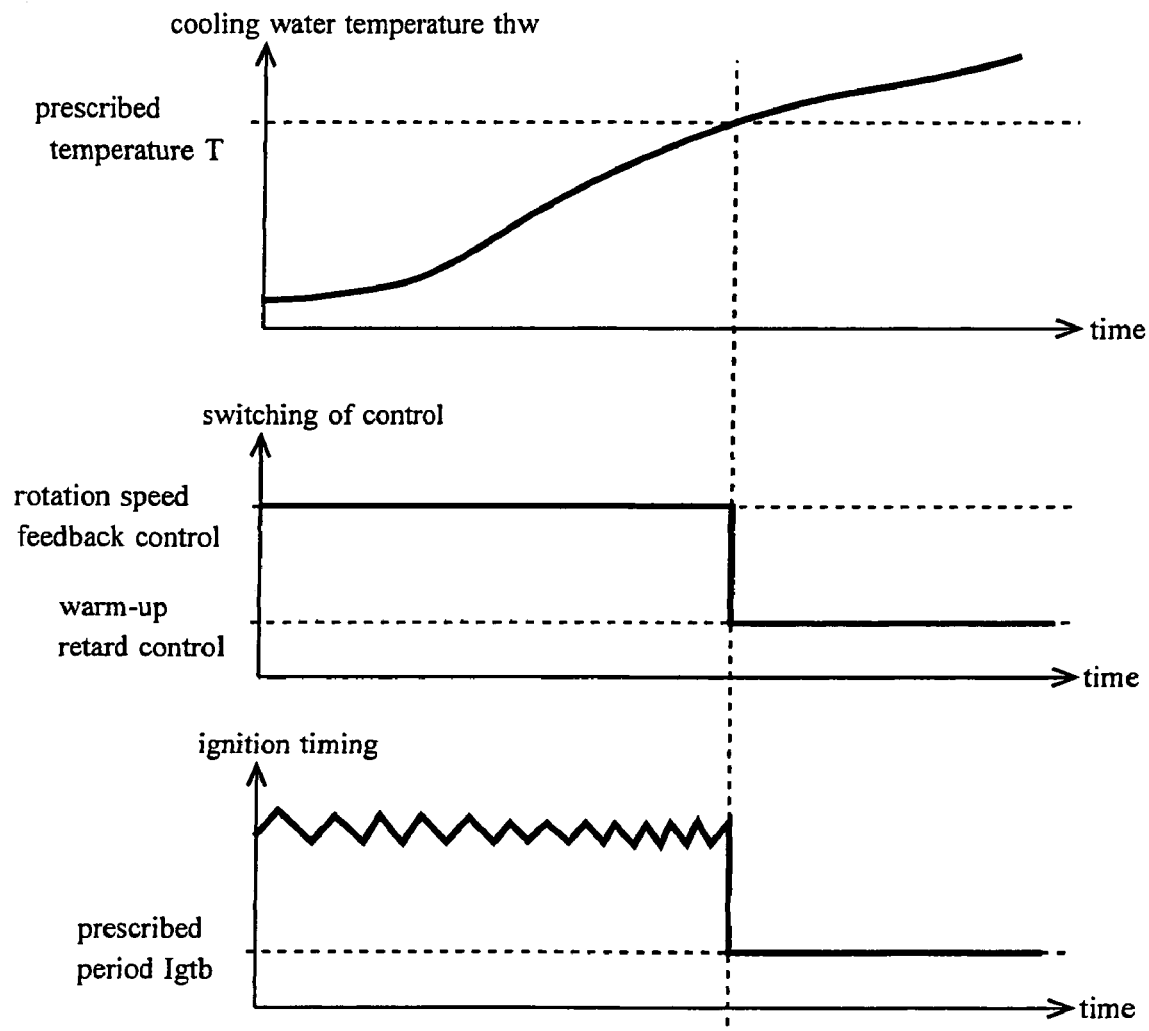
FIG. 2 is a timing chart showing execution timing of the rotation speed feedback control and warm-up retard control.

Thus, in the ignition timing control according to this embodiment, as shown in FIG. 2, when the temperature of the internal combustion engine 1 (COOLING WATER TEMPERATURE thw in FIG. 2) is lower than a prescribed temperature T, the ECU 19 controls the ignition timing by the rotation speed feedback control, and when the temperature of the internal combustion engine 1 (COOLING WATER TEMPERATURE thw in FIG. 2) has risen to or beyond the prescribed temperature T, the ECU 19 controls the ignition timing by the warm-up retard control.

The state of vaporization and/or atomization of the fuel injected by the fuel injection valve 12 varies depending on not only the temperature of the internal combustion engine 1 but also the altitude (more specifically, atmospheric pressure) of the place where the internal combustion engine 1 is used.

For example, the higher the atmospheric pressure is, the harder the fuel is to be vaporized and/or atomized. The lower the atmospheric pressure is, the easier the fuel is to be vaporized and/or atomized.

For the above reason, in cases where the internal combustion engine 1 is used in high altitude places, if switching between the rotation speed feedback control and the warm-up retard control is performed according to a condition the same as that in low altitude places, there is a possibility that activation of the exhaust gas purification apparatus 7 is unwantedly delayed.

In contrast, according to the ignition timing control of this embodiment, the ECU 19 is adapted to change the condition for executing the rotation speed feedback control according to the altitude of the place where the internal combustion engine 1 is used.

Figure 3:
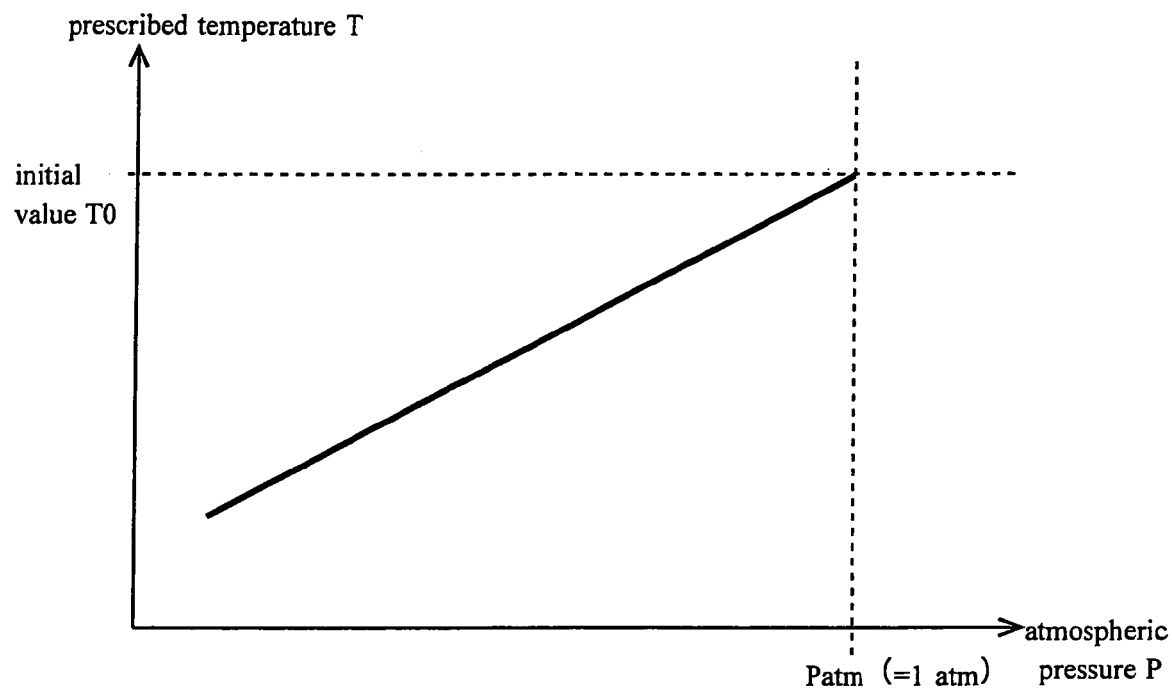
FIG. 3 is a graphical illustration of relationship between the atmospheric pressure P and prescribed temperature T.

Specifically, as shown in FIG. 3, when the measurement value (i.e. the atmospheric pressure) P of the atmospheric pressure sensor 20 is 1 atm (=Patm), the ECU 19 sets the prescribed temperature T to an initial value T0. When the measurement value P of the atmospheric pressure sensor 20 is lower than Patm, the lower the aforementioned measurement value P is, the lower the prescribed temperature T is made. The initial value T0 is a value that is suitable for the case in which the atmospheric pressure is 1 atm, which is determined in advance by experiments.

When the prescribed temperature T is changed in this way according to the altitude of the place where the internal combustion engine 1 is used, the prescribed temperature T in the case where the internal combustion engine 1 is used in a high altitude place becomes lower than that in the case where the internal combustion engine 1 is used in low altitude place.

Consequently, when the internal combustion engine 1 is used in a high altitude place, the activation timing of the exhaust gas purification apparatus 7 is prevented from being delayed unwantedly, because the timing of switching from the rotation speed feedback control to the warm-up retard control is not unwantedly delayed.

In addition, when the internal combustion engine 1 is used in high altitude places, since the fuel tends to be easily evaporated or atomized, an extension of the starting period or a change (or a decrease) in the idle rotation speed can be prevented from occurring even if the timing of switching from the rotation speed feedback control to the warm-up retard control is advanced.

Figure 4:
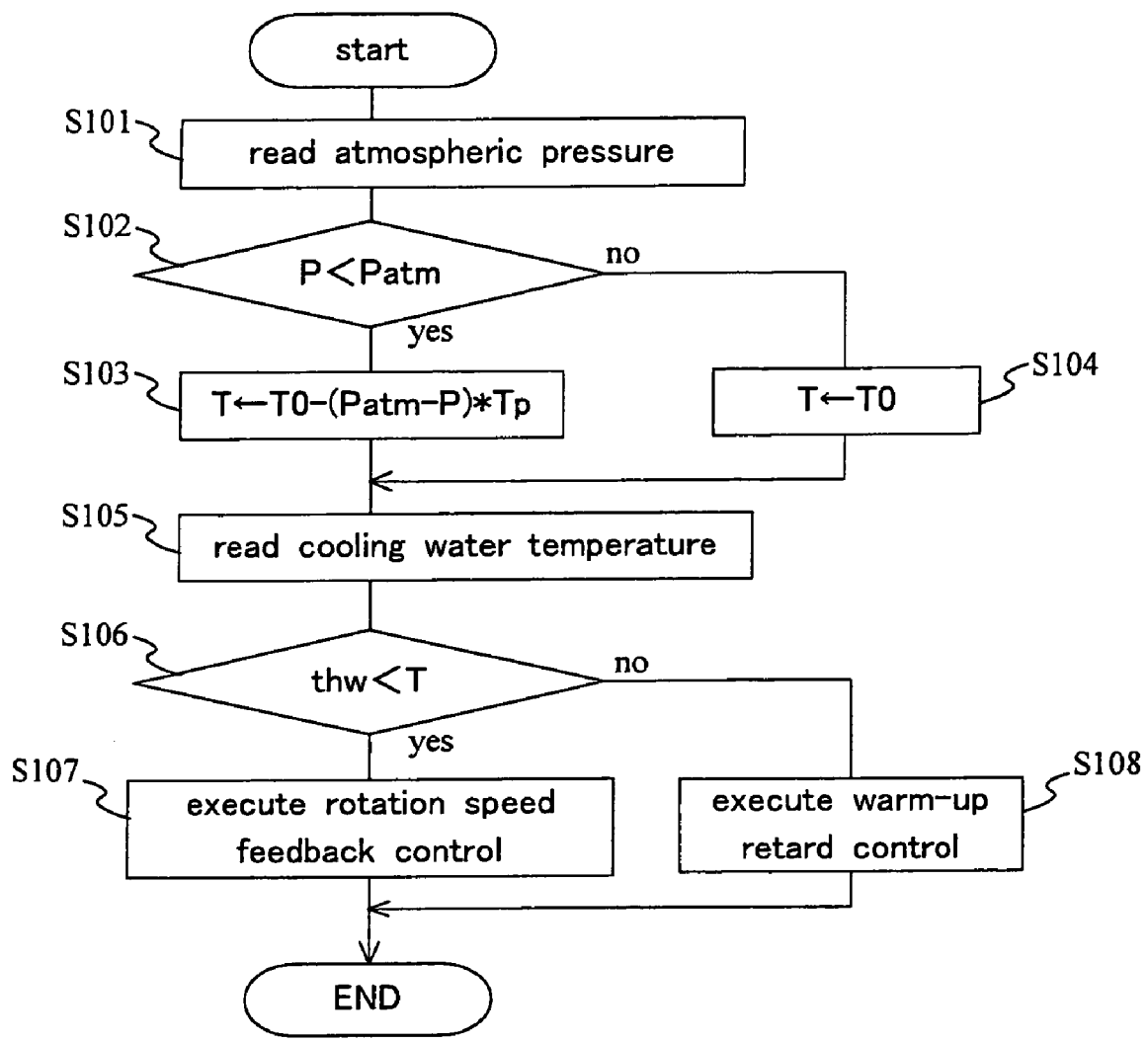
FIG. 4 is a flow chart of an ignition timing control routine.

In the following, a process of executing the ignition timing control in this embodiment will be described based on a flowchart of FIG. 4. The flow chart in FIG. 4 is a flowchart of an ignition timing control routine executed during the period of starting and warm-up of the internal combustion engine 1. This ignition timing control routine is stored in advance in the ROM of the ECU 19 and executed by the ECU 19 periodically.

In the ignition timing control routine, the ECU 19 first reads a measurement value (atmospheric pressure) P of the atmospheric pressure sensor 20 in step S101.

In step S102, the ECU 19 makes a determination as to whether or not the atmospheric pressure P read in the aforementioned step S101 is lower than 1 atm (Patm). If the determination in step S102 is affirmative (P<Patm), the ECU 19 advances to step S103. On the other hand, if the determination in step S102 is negative (P≧Patm), the ECU 19 advances to step S104.

In step S103, the ECU 19 changes the prescribed temperature T based on the aforementioned atmospheric pressure P. Specifically, the ECU 19 changes the prescribed temperature T according to the following formula.

$$T = T0 - (Patm - P) * Tp$$

In the above formula, Tp is a correction coefficient, which is determined in such a way that the prescribed temperature T and the atmospheric pressure P satisfy the relationship as shown in FIG. 3 described before. Alternatively, the ECU 19 may use, in step S103, a map that specifies the relationship as shown in FIG. 3 instead of using the formula presented above.

On the other hand, in step S104, the ECU 19 sets the initial value T0 mentioned in the above description of FIG. 3 as the prescribed temperature T.

After execution of the process of the above-described step S103 or step 104, the ECU 19 advances to step S105. In step S105, the ECU 19 reads the measurement value (or cooling water temperature thw) of the water temperature sensor 18 as the temperature of the internal combustion engine 1.

In step S106, the ECU 19 makes a determination as to whether or not the cooling water temperature thw read in the aforementioned step S105 is lower than the prescribed temperature T set in the aforementioned step S103 or S104. If the determination in step S106 is affirmative (thw<T), the ECU 19 advances to step S107. On the other hand, if the determination in step S106 is negative (thw≧T), the ECU 19 advances to step S108.

In step S107, the ECU 19 controls the operation timing (or ignition timing) of the ignition plug 13 by the rotation speed feedback control.

In step S108, the ECU 19 controls the operation timing (or ignition timing) of the ignition plug 13 by the warm-up retard control.

As described in the foregoing, by execution of the ignition timing control routine shown in FIG. 4 by the ECU 19, the feedback unit, the retard unit, the switch unit, the obtaining unit and the changing unit according to the present invention are implemented. As a result, ignition timing that is suitable for the environment (altitude) in which the internal combustion engine 1 is used can be achieved.

Therefore, according to the ignition control system for an internal combustion engine of this embodiment, even if the altitude of the place where the internal combustion engine is high, advantageous effects such as early activation of the exhaust gas purification apparatus 7 can be achieved.

The invention claimed is:

1. An ignition control system for an internal combustion engine comprising:
   a feedback unit for controlling ignition timing by feedback in such a way that a value correlating with an engine rotation speed converges to a target value, when the temperature of a spark ignition internal combustion engine is lower than a prescribed temperature;
   an obtaining unit for obtaining an atmospheric pressure;
   a changing unit for changing said prescribed temperature according to the atmospheric pressure obtained by said obtaining unit.

2. An ignition control system according to claim 1, wherein the lower the atmospheric pressure obtained by said obtaining unit is, the lower said prescribed temperature is made by said changing unit.

3. An ignition control system for an internal combustion engine comprising:
   a feedback unit for controlling ignition timing by feedback in such a way that a value correlating with an engine rotation speed of an spark ignition internal combustion engine converges to a target value;

a retard unit for retarding the ignition timing of said internal combustion engine by a prescribed amount from a specific target ignition timing;

a switch unit for, when the temperature of said internal combustion engine is lower than a prescribed temperature, causing said feedback unit to control ignition timing of said internal combustion engine, and when the temperature of the internal combustion engine is equal to or higher than said prescribed temperature, causing said retard unit to control ignition timing of the internal combustion engine;

an obtaining unit for obtaining an atmospheric pressure;

a changing unit for changing said prescribed temperature according to the atmospheric pressure obtained by said obtaining unit.

* * * * *